United States Patent
Kluth et al.

(10) Patent No.: US 10,451,009 B2
(45) Date of Patent: Oct. 22, 2019

(54) METHOD FOR KNOCK CONTROL OF AN INTERNAL COMBUSTION ENGINE

(71) Applicant: Robert Bosch GmbH, Stuttgart (DE)

(72) Inventors: Carsten Kluth, Stuttgart (DE); Li Luo, Schwieberdingen (DE); Marcus Leuz, Oberkessach (DE); Martin Streib, Vaihingen (DE); Stefan Polach, Vienna (AT); Thorsten Klinkhammer, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/565,890

(22) PCT Filed: Apr. 7, 2016

(86) PCT No.: PCT/EP2016/057635
§ 371 (c)(1),
(2) Date: Oct. 11, 2017

(87) PCT Pub. No.: WO2016/177531
PCT Pub. Date: Nov. 10, 2016

(65) Prior Publication Data
US 2018/0112631 A1     Apr. 26, 2018

(30) Foreign Application Priority Data

May 6, 2015   (DE) .................. 10 2015 208 359

(51) Int. Cl.
*F02M 25/022*     (2006.01)
*F02M 25/025*     (2006.01)
(Continued)

(52) U.S. Cl.
CPC ......... *F02M 25/0227* (2013.01); *F02D 19/12* (2013.01); *F02D 41/1405* (2013.01);
(Continued)

(58) Field of Classification Search
CPC .. F02M 25/0227; F02M 25/03; F02M 25/025; F02D 41/1405; F02D 41/1498;
(Continued)

(56) References Cited

U.S. PATENT DOCUMENTS 4,054,110 A * 10/1977 Walker .................... F02P 5/106
                                                     123/406.69
4,120,272 A * 10/1978 Douaud ................ F02P 5/1526
                                                     123/406.39
(Continued)

FOREIGN PATENT DOCUMENTS

DE           10200946 A1 *  7/2003  ......... F02D 41/1405
DE     102008041840 A1 * 10/2009  ........... G01L 23/225
(Continued)

OTHER PUBLICATIONS

International Search Report dated Jun. 24, 2016, of the corresponding International Application PCT/EP2016/057635 filed Apr. 7, 2016.

*Primary Examiner* — Sizo B Vilakazi
*Assistant Examiner* — Brian R Kirby
(74) *Attorney, Agent, or Firm* — Norton Rose Fulbright US LLP; Gerard Messina

(57) ABSTRACT

A method for knock control of an internal combustion engine capable of being operated using a water injection system, in which at least one parameter of the knock control is determined as a function of a variable connected to the water injection system, in particular the water content.

8 Claims, 3 Drawing Sheets

(51) Int. Cl.
  *F02P 5/152* (2006.01)
  *F02D 19/12* (2006.01)
  *F02M 25/03* (2006.01)
  *F02D 41/14* (2006.01)
  *F02B 47/02* (2006.01)
  *F02D 35/02* (2006.01)
  *F02D 41/00* (2006.01)

(52) U.S. Cl.
  CPC ....... *F02D 41/1498* (2013.01); *F02M 25/025* (2013.01); *F02M 25/03* (2013.01); *F02P 5/1523* (2013.01); *F02B 47/02* (2013.01); *F02D 35/027* (2013.01); *F02D 41/0025* (2013.01); *F02P 5/1522* (2013.01); *Y02T 10/46* (2013.01)

(58) Field of Classification Search
  CPC .... F02D 19/12; F02D 41/0025; F02D 35/027; F02P 5/1523; F02P 5/1522; Y02T 10/46; F02B 47/02
  See application file for complete search history.

(56) References Cited

U.S. PATENT DOCUMENTS

| | | | | | |
|---|---|---|---|---|---|
| 4,261,313 | A | * | 4/1981 | Iwata | F02P 5/1527 123/406.39 |
| 4,428,343 | A | * | 1/1984 | Schweikert | F02P 5/1521 123/406.36 |
| 4,480,616 | A | * | 11/1984 | Takeda | F02P 5/1502 123/198 A |
| 4,541,383 | A | * | 9/1985 | Jessel | F02D 19/12 123/435 |
| 4,542,727 | A | * | 9/1985 | Britsch | F02P 5/152 123/406.3 |
| 4,558,665 | A | * | 12/1985 | Sandberg | F02M 25/028 123/25 A |
| 4,760,828 | A | * | 8/1988 | Shimada | F02B 75/16 123/406.21 |
| 4,790,281 | A | * | 12/1988 | Mieno | F02P 5/1521 123/406.36 |
| 4,796,586 | A | * | 1/1989 | Tanaka | F02P 5/1521 123/406.36 |
| 4,856,480 | A | * | 8/1989 | Nakajima | F02P 5/1521 123/406.35 |
| 4,856,481 | A | * | 8/1989 | Kamise | F02D 41/1498 123/406.3 |
| 5,125,366 | A | * | 6/1992 | Hobbs | F02B 47/02 123/25 C |
| 5,230,316 | A | * | 7/1993 | Ichihara | G01L 23/225 123/406.38 |
| 5,803,047 | A | * | 9/1998 | Rask | F02D 35/021 123/406.37 |
| 5,992,386 | A | * | 11/1999 | Nytomt | F02D 35/021 123/406.34 |
| 6,553,949 | B1 | * | 4/2003 | Kolmanovsky | F02B 75/045 123/406.21 |
| 2003/0216853 | A1 | * | 11/2003 | Jacobson | F02D 35/023 701/106 |
| 2005/0016496 | A1 | * | 1/2005 | Hitomi | F01L 1/053 123/305 |
| 2007/0062488 | A1 | * | 3/2007 | Kobayashi | F02D 35/027 123/406.16 |
| 2007/0119391 | A1 | * | 5/2007 | Fried | F02B 47/02 123/25 A |
| 2007/0215102 | A1 | * | 9/2007 | Russell | F02D 35/027 123/310 |
| 2011/0174268 | A1 | * | 7/2011 | Surnilla | F02D 35/027 123/406.29 |
| 2011/0259298 | A1 | * | 10/2011 | Imamura | F02B 19/108 123/436 |
| 2012/0024262 | A1 | * | 2/2012 | Leone | F02D 35/027 123/406.47 |
| 2013/0218438 | A1 | * | 8/2013 | Surnilla | F02D 41/0025 701/102 |
| 2014/0102403 | A1 | * | 4/2014 | Yoshihara | F02D 35/027 123/25 A |
| 2016/0356257 | A1 | * | 12/2016 | Kitayama | F02P 17/12 |

FOREIGN PATENT DOCUMENTS

| | | | |
|---|---|---|---|
| DE | 102008041840 A1 | 10/2009 | |
| DE | 2020151 00452 U1 | 2/2015 | |
| DE | 102014204509 A1 | 9/2015 | |
| EP | 2700804 A1 | 2/2014 | |
| JP | 58150073 A | * 9/1983 | ............. F02P 5/152 |
| JP | 58150073 A | * 9/1983 | ............. F02P 5/152 |
| JP | 59173546 A | * 10/1984 | ............. F02D 19/12 |
| JP | 59173546 A | * 10/1984 | ............. F02D 19/12 |
| WO | 0220963 A1 | 3/2002 | |

* cited by examiner

METHOD FOR KNOCK CONTROL OF AN INTERNAL COMBUSTION ENGINE

FIELD

The present invention relates to a method for knock control of an internal combustion engine capable of being operated using a water injection system. The present invention furthermore relates to a control and/or regulating device for an internal combustion engine capable of being operated using a water injection system and a computer program that is executable on an aforementioned control and/or regulating device.

BACKGROUND INFORMATION

In internal combustion engines, it is under certain conditions possible for an uncontrolled combustion or a self-ignition of the residual mixture to occur following the actual ignition and intended firing of the mixture, which is called engine knock. Knocking combustions cause great mechanical and thermal stress in the engine, which can result in damage.

To prevent engine knock or to return to a knock-free operation of the internal combustion engine following the detection of engine knock and in order to be able to operate the engine as closely as possible to the knock limit, a so-called knock control is used, in which usually the ignition timing is retarded. Aside from further measures such as reducing the load or enriching the fuel mixture, conventionally, cooling and explosion-reducing substances are injected such as water for example. By way of the water injection, in which preferably distilled water or a water/alcohol mixture is injected into the combustion chamber or the intake manifold of the internal combustion engine, it is possible to reduce the knock tendency or to shift the knock limit so that it is possible to operate the engine at a more optimal operating point.

The water injection causes inter alia a cooling of the mixture and an interior cooling of the engine and has an influence on the course of the combustion. Because of the colder combustion air and thus the latter's greater density, the water injection is able to achieve an increase in performance. The latter is in most cases the reason why water injection is used in a vehicle.

SUMMARY

An object of the present invention is to optimize the knock control of an internal combustion engine capable of being operated using a water injection system so as to allow for an optimized operation of the internal combustion engine while knock is being controlled.

This object maybe achieved by a method in accordance with the present invention, in that at least one parameter of the knock control is determined as a function of a variable related to the water injection system. A variable related to the water injection system is for example the duration of the water injection or the injection pressure. It is particularly advantageous, however, to take into consideration the quantity of the injected water.

By injecting water into an intake manifold or directly into the combustion chambers of the internal combustion engine, it is possible to shift an operating point determining the knock tendency or the knock limit, which makes it possible to improve the operation of the internal combustion engine on the whole. The injection of water influences the combustion and in particular also the knock tendency. It is possible to ascertain this influence and thus advantageously to take it into consideration in the knock control.

The water injection is preferably taken into consideration when determining the ignition angle and/or the control system acting time, that is, the duration of the active knock control. By taking into consideration the water injection when determining these parameters of the knock control and thus the influence of the water injection on the combustion, it is possible to operate the engine during knock control at an operating point that is overall more optimal, for example because less ignition control is required and/or because it is possible to shorten the duration of the knock control.

The at least one parameter, that is, for example the ignition angle and/or the control system acting time, is ascertained as a function of a characteristics map or multiple characteristics maps by using an interpolation of values, which are taken from at least two characteristics maps, a neural network, a Gaussian distribution and/or a so-called support vector machine (SVM).

According to one possible specific embodiment, one of the characteristics maps describes the parameter(s) for a knock control without water injection and another characteristics map describes the parameter(s) for a knock control during a water injection with a maximum water content.

According to another possible specific embodiment, one characteristics map describes the dependency of the parameter(s) to be set during the knock control on the injected water content. According to another advantageous specific embodiment, a knock frequency is ascertained and the at least one parameter is determined as a function of the knock frequency. This makes it possible to take into account the tolerances in the injection of water, that is, in particular a deviation between the actual value and the setpoint value, which makes it possible to perform the knock control with even greater precision. According to one possible specific embodiment, in this instance the influence of the knock frequency on the at least one parameter is determined as a function of whether the knock frequency reaches and/or exceeds a specifiable threshold value. If the knock frequency exceeds this value, then the timing retard is increased and/or the control system acting time is extended.

According to another possible specific embodiment, the at least one parameter is determined as a function of the time interval between two knocking combustions. If the interval between two knocking combustions is smaller than a specifiable threshold value, the timing retard and/or the time for the timing advance are modified, for example. Generally, the timing retard will be selected to be greater and the duration until the timing advance will be selected to be longer.

The method according to the present invention may be carried out for one or multiple cylinders of the internal combustion engine. For this purpose, the at least one operating parameter may be modified in the same manner for all cylinders, or the at least one operating parameter may be modified differently for each individual cylinder.

Furthermore, there may be a provision that a range is specified or ascertained, within which the modifications of all cylinders must fall. This makes it possible to check possible cylinder-specific deviations and to correct them, if necessary, with reference to the specified range.

The object may furthermore be achieved in accordance with the present invention by a control or regulating device for an internal combustion engine, which is designed for carrying out the method of the present invention, as well as by a computer program that runs on a control or regulating device for an internal combustion engine and that is programmed for carrying out the method of the present invention.

Further features, uses and advantages of the present invention result from the subsequent description of exemplary embodiments, which are explained with reference to the figures, it being possible that the features are important for the invention both in isolation as well as in different combinations, without additional explicit reference being made to this fact.

DETAILED DESCRIPTION OF EXAMPLE EMBODIMENTS

Figure 1:
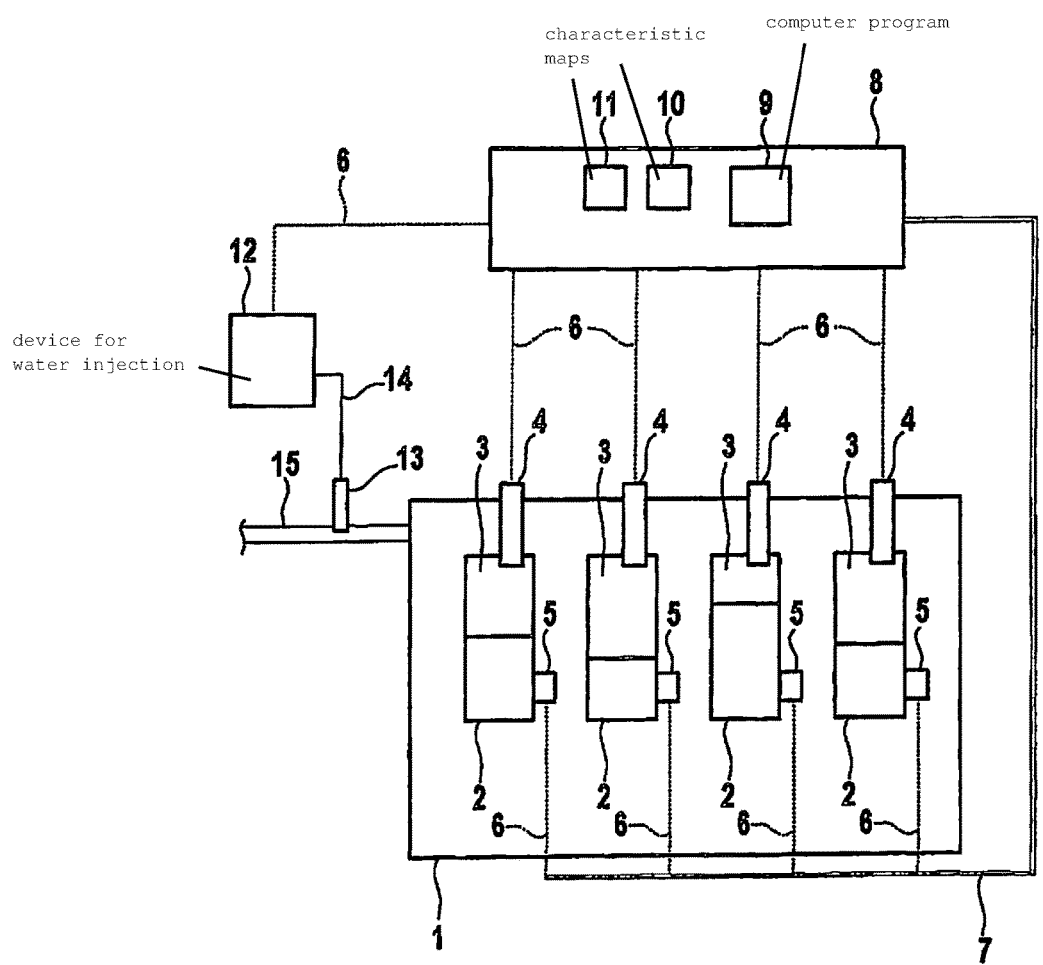
FIG. 1 shows a schematic representation of an internal combustion engine, which is suitable for carrying out the method of the present invention.

FIG. 1 shows an internal combustion engine 1. Internal combustion engine 1 has multiple cylinders 2, in which respectively one combustion chamber 3 is developed. Each combustion chamber has assigned to it an ignition system 4 comprising a spark plug and an ignition coil, for example. In the exemplary specific embodiment shown in FIG. 1, one knock sensor 5 is assigned to each cylinder. Ignition systems 4 and knock sensors 5 are connected to a control device 8 in a conventional manner for example via signal lines 6 and/or via a bus system 7.

Control device 8 stores a computer program 9, which is programmed to perform the method of the present invention according to one of the possible specific embodiments. Furthermore, two characteristics maps 10 and 11 are stored in control device 8. For a specific operating point of internal combustion engine 1, it is possible for example to retrieve from characteristics map 10 the values for an ignition timing and the values for the control system acting time for the knock control or the time duration until the reset of the ignition, a knock control being assumed in this instance that operates in a conventional manner, that is, without drawing upon or taking into account the influence of a water injection system.

In the specific embodiment shown in FIG. 1, it is possible, for a specific operating point of internal combustion engine 1, to retrieve from characteristics map 11 values for the same parameters for the knock control as from characteristics map 10, while characteristics map 11, however, contains those values for the ignition timing and/or the control system acting time that were ascertained by taking into account a water injection, in which the injection of water occurs with a maximally possible water content. Additionally or alternatively, of course, additional characteristics maps may be stored in control device 8, using which it is possible to set the parameters for performing the knock control.

FIG. 1 furthermore shows a device for water injection 12, which comprises for example a reservoir for water and/or alcohol (not shown in FIG. 1), a compressor and a pressure reservoir, and which is connected via a pressure line 14 to an injector 13, which is situated in an intake manifold 15 of internal combustion engine 1.

Of course, a multitude of additional specific embodiments of the system shown in FIG. 1 are possible. For example, it is possible for an injector 13 for water injection to be assigned to each one of cylinders 2 or combustion chambers 3 such that water is not injected into the intake manifold, but rather directly into the respective cylinder, which allows for the water injection to be taken into account in the knock control in an even more precise manner. Furthermore, additionally or alternatively, further sensors may be provided for detecting knock. Such sensors are available in the market and may be for example combustion chamber pressure sensors, ion current sensors or a speed sensor.

Figure 2:
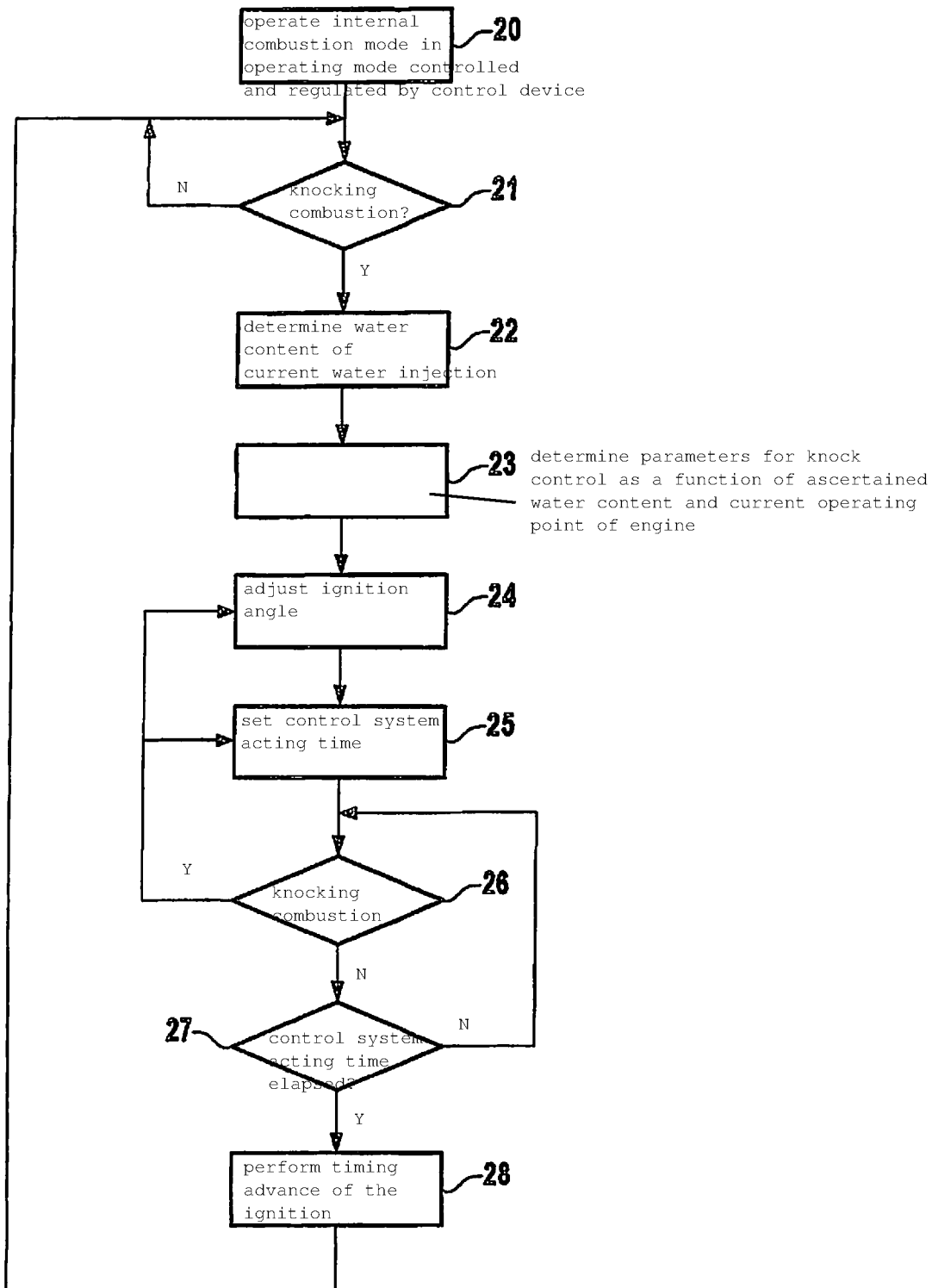
FIG. 2 shows a flow chart, in which some steps of the method of the present invention are represented.

FIG. 2 shows a flow chart, in which some method steps of a possible specific embodiment of the method of the present invention are represented. The method starts in a step 20, in which internal combustion engine 1 is operated in an operating mode that is controlled and regulated by control device 8. As shown in step 21, in this operating mode, a continuous check is performed to determine whether a knocking combustion occurs in one or several of cylinders 2. If this is the case, the water content of the current water injection is determined in a step 22.

In a step 23, the parameters for the knock control are determined as a function of the ascertained water content and the current operating point of internal combustion engine 1. These parameters comprise preferably an ignition angle, which is used for the timing retard of the ignition typically to be performed, and a control system acting time, that is, the time duration until the timing advance of the ignition. Typically, a timing retard of the ignition angle with water injection will be smaller than without water injection.

According to one possible specific embodiment, the values for the ignition timing and the control system acting time are ascertained by using the two characteristics maps 10 and 11. Characteristics map 10, for example, provides the values for the timing retard and/or the control system acting time that would have to be selected in order to prevent the knocking combustion without an injection of water, and characteristics map 11 provides the values for the timing retard and/or the acting time that would have to be selected in the current operating point if a water injection with a maximum water content were to occur. Then an interpolation between these read-out values is performed for the timing retard and/or the control system acting time as a function of the current water content of the water injection and in this manner the values actually to be selected for the timing retard and/or the acting time are ascertained.

According to another possible specific embodiment, a characteristics map is stored in control device 8, as an alternative or in addition to characteristics maps 10 and 11, from which it is possible directly to retrieve the values for the parameters to be modified during the knock control as a function of the current operating point and the water content and/or another characteristic variable of the water injection such that no interpolation needs to be performed.

According to yet another specific embodiment, there may be a provision in control device 8, as an alternative or in addition to characteristics maps 10 and 11, to ascertain the values for the parameters to be modified during the knock control as a function of the current operating point and the water content and/or another characteristic variable of the water injection or of internal combustion engine way of neural networks and/or support vector machines (SVMs) or Gaussian distributions.

In a step 24, the ignition angle is adjusted—typically in the direction of retardation. As described above, the ignition angle is adjusted in accordance with the present invention by taking into account the influence of the water injection on the combustion such that usually a lesser ignition retard is required in order to allow for a knock-free operation of the internal combustion engine, which results in a more economical operation of the internal combustion engine.

There is preferably a provision for the modification of the ignition timing to occur for each cylinder 2 of internal combustion engine 1 individually and for a range to be specified or ascertained, in which the modifications of all cylinders 2 must lie. This makes it possible to check possibly existing cylinder-specific deviations and, if they are assessed as excessive, to correct them with reference to the specified range.

In a step 25, the control system acting time ascertained in step 23 is set, and a check is performed in a step 26 whether a knocking combustion continues to occur. If this is the case, then the timing retard and/or the control system acting time are/is adapted and newly set in steps 24 and 25. If knock does not occur any longer, a check is performed in step 27 to determine whether the control system acting time has elapsed. If this is not the case, a further check is performed to determine whether a knocking combustion occurs. If the control system acting time has elapsed, then a timing advance of the ignition is performed in a step 28. Subsequently, the internal combustion engine is again operated in the normal operating mode, a check again being performed in step 21 to determine whether a knocking combustion occurs and, if this is the case, the knock control according to the present invention being performed anew.

Of course, additional developments are possible in the specific embodiment described in exemplary fashion in FIG. 2. In particular, it is possible to switch the order of individual steps such as steps 24 and 25, for example, or to perform them in parallel such as for example steps 24 and 25 as well as steps 26 and 27.

An alternative specific embodiment is particularly significant, in which the method starts, as previously described, with step 20, but in which case the internal combustion engine is in an operating mode, in which it is not operated with water injection. If a knocking combustion is detected in this specific embodiment in step 21, there may be a provision to activate a water injection in step 22 and to check whether by this measure it is already possible to prevent the knock. Otherwise, as described previously, the ignition timing is additionally adjusted and the control system acting time is determined, the influence of the water injection in the combustion being, of course, taken into account, as previously described.

It is furthermore possible to vary a water injection already occurring during a knock-free operation of the internal combustion engine upon detecting a knock during the knock control in such a way that an optimized operation is possible during the knock control. For this purpose, there may be in particular a provision to increase the water content of the water injection and to take this into account when determining the other parameters for carrying out the knock control.

Figure 3:
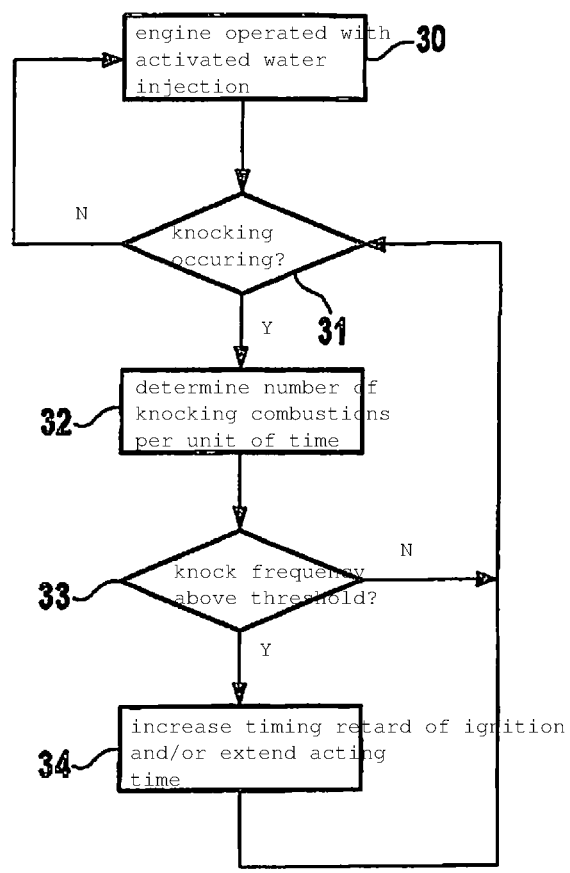
FIG. 3 shows another flow chart, in which additional possible steps of the method of the present invention are represented.

FIG. 3 shows additional method steps that advantageously may be performed in a possible specific embodiment of the method of the present invention.

In a block 30, it is assumed that internal combustion engine 1 is operated with activated water injection. Block 30 may be run through both prior to a knock control, but in particular also during a knock control. A check is performed in a step 31 to determine whether a knocking combustion is occurring. If this is the case, then the knock frequency, that is, the number of knocking combustions per unit of time, is determined in a step 32. Alternatively or additionally, the time interval between two knocking combustions may also be determined in step 31. A check is performed in a step 32 to determine whether the knock frequency is above a specifiable threshold value. If this is the case, then in a step 34 the timing retard and/or the control system acting time are corrected within the knock control, for example by increasing the timing retard of the ignition and/or extending the acting time. Of course, in this case it is also possible to take into account the current value of the knock frequency.

Method steps 30 through 34 may be integrated in various ways in the specific embodiment shown in FIG. 2. There may be a provision, for example, to perform these steps as an alternative or in addition to step 27. Thus, for example, the combustion in cylinders 2 is monitored for knock events using knock sensors 5 or other sensors. The intensity, the type, the frequency, the cylinder-specific distribution of the knock events and/or a time interval between respectively two knock events is then used as input variable for adjusting the ignition and the duration of the knock control, which allows for a still more precise knock control and thus for an operation of the internal combustion engine that is as close to the knock limit as possible.

What is claimed is:

1. A method for knock control of an internal combustion engine capable of being operated using a water injection system, the method comprising:
    ascertaining a knock frequency;
    determining a control system acting time as a function of the ascertained knock frequency and as function of a variable connected to the water injection system, the control system acting time being a time duration of a delay from a time when knock no longer occurs to a time when an ignition angle is advanced following the time when the knock no longer occurs; and
    adjusting the ignition angle in a retarded direction in the case of knock and, when knock no longer occurs, advancing the ignition angle following an elapse of the determined control system acting time.

2. The method as recited in claim 1, wherein the control system acting time is determined as a function of a quantity of water injected by the water injection system.

3. The method as recited in claim 2, wherein the control system acting time is determined as a function of at least one characteristics map.

4. The method as recited in claim 3, wherein the control system acting time is ascertained using: (i) an interpolation between values read out from at least two characteristics maps, or (ii) a neural network, or (iii) a Gaussian distribution, or (iv) a support vector machine.

5. The method as recited in claim 1, wherein an influence of the knock frequency on the control system acting time is determined as a function of whether the knock frequency reaches or exceeds a specifiable threshold value.

6. The method as recited in claim 1, wherein the ascertained knock frequency is the number of knocking combustions per unit of time.

7. The method as recited in claim 1, wherein the ascertained knock frequency is a function of the time interval between two knocking combustions.

8. The method as recited in claim 1, wherein the variable connected to the water injection system is one of: (i) a duration of a water injection of the water injection system, (ii) an injection pressure of the water injection, or (iii) a quantity of water injected during the water injection.

* * * * *